United States Patent [19]
Alfonso et al.

[11] Patent Number: 4,584,149
[45] Date of Patent: Apr. 22, 1986

[54] PROCESS FOR PREPARING SELF-EXTINGUISHING FORMED THERMO-PLASTIC BODIES BASED ON POLYCAPROLACTAM

[75] Inventors: Giovanni C. Alfonso; Saverio Russo; Enrico Pedemonte; Antonio Turturro, all of Genoa; Concetto Puglisi, Catania, all of Italy

[73] Assignee: Consiglio Nazionale Delle Ricerche, Rome, Italy

[21] Appl. No.: 619,030

[22] Filed: Jun. 11, 1984

[30] Foreign Application Priority Data

Jul. 4, 1983 [IT] Italy ................................ 21912 A/83

[51] Int. Cl.⁴ .......................... B29B 9/10; B29B 9/14; B29C 39/00; C08K 9/10
[52] U.S. Cl. .......................................... 264/5; 264/13; 264/211; 264/331.19; 264/DIG. 61; 523/206; 523/208
[58] Field of Search .......... 264/211, DIG. 61, 331.19, 264/5, 13; 523/208, 206

[56] References Cited

U.S. PATENT DOCUMENTS

| | | | |
|---|---|---|---|
| 3,417,178 | 12/1968 | Downing et al. | 264/331.19 |
| 3,454,689 | 7/1969 | Garrison | 264/331.19 X |
| 3,494,999 | 2/1970 | Heckrotte | 264/331.19 X |
| 3,642,974 | 2/1972 | Jacobi et al. | 264/331.19 X |
| 3,658,975 | 4/1972 | Drabek et al. | 264/331.19 X |
| 4,208,317 | 6/1980 | Cerny et al. | 523/208 X |

FOREIGN PATENT DOCUMENTS 0052217  5/1982  European Pat. Off. .

Primary Examiner—Philip Anderson
Attorney, Agent, or Firm—Karl F. Ross; Herbert Dubno

[57] ABSTRACT

A process for preparing self-extinguishing formed thermoplastic bodies based on polycaprolactam, which consists in polymerizing, by anionic way, in suitable molds ϵ-caprolactam, by previously incorporating into said ϵ-caprolactam a flame-retardant and optionally at least a known coadjuvant substance, said flame-retardant being composed of red phosphorus powder microencapsulated in a synthetic resin, preferably in a melamine resin.

5 Claims, No Drawings

PROCESS FOR PREPARING SELF-EXTINGUISHING FORMED THERMO-PLASTIC BODIES BASED ON POLYCAPROLACTAM

BACKGROUND OF THE INVENTION

This invention relates to a process for preparing formed polycaprolactam bodies which are rendered self-extinguishing by incorporating red phosphorus in powder thereinto.

As is known, polycaprolactam (hereinafter referred to as PCL) is a thermoplastic aliphatic polyamide, usually called Nylon-6, which is widely used, due to its excellent physical and mechanical properties, in various technical fields, from that of fibres to one of the components for the electrotechnical and automotive industry.

Nevertheless, the utilization of PCL finds considerable limitations and hindrances in those fields of use for which risks of fire exist, namely in relation to the inflammability and to the easy flame propagation of PCL.

It is known that PCL can be rendered self-extinguishing by a process contemplating first the preparation of a mechanical mixture of granules of PCl and of a suitable flame-retardant, and, successively, the incorporation of said retarding agent into PCL by plastic melting-mixing of the abovesaid mechanical mixture in screw extruders operating at temperatures above 230° C., thereby obtaining self-extinguishing PCL granules. Such granules, in order to be transformed into formed articles, must be then melted again to the plastic state, always at high temperatures, for example in presses for the injection molding of finished articles, and in extruders for the forming of structural shapes and the like.

The above process, as is apparent, is affected by the drawbacks of requiring high consumptions of energy, of causing, due to the action of heat and of friction, undesired modifications in the distribution of the PCL molecular masses (and, by consequence, in the physical and mechanical properties of PCL), and, finally, of not obtaining the optimal distribution of the flame retarding agent in the body of the PCL finished article.

SUMMARY OF THE INVENTION

It has been now found—and that is the object of the invention—that it is possible to obtain finished bodies and articles of self-extinguishing PCL by directly polymerizing in suitable molds, at relatively low temperatures by the anionic way, ε-caprolactam (hereinafter referred to as CL), by previously incorporating into CL a conventional flame-retardant, said flame-retardant being composed of red phosphorus powder micro-encapsulated in a synthetic resin, preferably a melamine resin.

DETAILED DESCRIPTION OF THE INVENTION

More in particular, said polymerization (which can be accomplished also by means of the known RIM technique=Reaction Injection Molding technique) is effected at a temperature ranging from 120° to 190° C. in the presence of a catalyst system composed of a basic initiator and by an activator, and said red phosphorus powder is micro-encapsulated in a synthetic resin, as it has been surprisingly found that such micro-encapsulated red phosphorus powder does not prevent the anionic polymerization of CL (contrary to what conversely happens when other types of flame retarding agents are used, as will be explained later on herein), polymerization conversions of CL to PCL of the order of 98% being obtained.

The abovesaid micro-encapsulated red phosphorus powder can be obtained, for example, according to European Patent Application No. 81107981.3 (Publication No. 0 052 217; Date of publication of application: May 26, 1982), i.e. by coating the particles of a red phosphorus powder (having sizes below 40 μm) with a melamine resin, by precipitation of same from the corresponding cationized precondensate obtained from melamine (25.27–21.62% by weight), formaldehyde (36.04–30.85% by weight), triethanolamine (29.87–25.57% by weight) and methanol (8.82–21.96% by weight).

More particularly, the micro-encapsulation of the red phosphorus powder is accomplished by following the operative steps illustrated hereinafter, according to what is described (by way of exemplification) in the above-mentioned EP Application No. 81107981.3:

(a) preparation of the melamine condensate: there are reacted, in a first step, for about two hours at about 85° C., methanol, triethanolamine and formaldehyde (the last in an aqueous solution at about 45% on a dry basis) in the percent proportions, referred to the dry substance, of 8.82%, 29.87% and 36.04%, respectively, the remaining 25.27% being represented by the melamine which is added in a second step (on conclusion of the above reaction), in order to give rise to the forming of the melamine condensate by heating the said composition (by first bringing the pH from an initial value of 9.5-9.8 to a value of 7.5-7.8) to about 90° C. for approximately 6 hours till obtaining a viscosity of 420–470 cP (measured at 20° C.), and diluting at last with water, after having adjusted the pH at a value of 7-7.6, thereby obtaining a solution at about 38% of dry matter, with a viscosity of 40–50 cP at 20° C. The pH adjustments are carried out by utilizing hydrochloric acid in a 18% aqueous solution, thus cationizing the melaminic condensate.

(b) Encapsulation of the red phosphorus powder: to a water-dispersion of micronized red phosphorus powder (particle size below 40 μm, with at least 80% by weight below 10 μm), having a density of 1.38–1.58, there is added the aqueous solution at 38% of cationized melamine condensate, prepared as per (a) hereinbefore, in the desired amount (for example 4–6% by weight with respect to red phosphorus, expressed as dry matter on a dry basis); the phosphorus dispersion in the so obtained melamine condensate solution is heated, under stirring, for about one hour to about 100° C., while maintaining the reaction mixture volume substantially unaltered—by means of a condenser—: under these conditions, the melamine condensate slowly and uniformly precipitates, as a partially cross-linked resin, around the red phosphorus particles, thereby encapsulating them. Cross-linking of the resin is then completed during the drying of the product at about 100° C. under vacuum.

The process for preparing self-extinguishing polycaprolactam according to the invention has the advantage of being simplified and rapid, with polymerization times and temperatures (generally of the order of 4-6 minutes and of 150°-160° C., respectively) involving low energy requirements; the process, furthermore, accomplishes the incorporation of red phosphorus without subjecting the polymer (PCL) to the above-mentioned undesired and detrimental actions of heat and friction, thus obtaining finally finished bodies and articles of flameproof PCL having unaltered physical and mechanical properties, also in relation to the fact that the micro-encapsulated red phosphorus powder does not adversely affect said properties, but, conversely, improves the PCL resistance to thermal decomposition, as will be proved later on herein.

It should be added, at last, that—as is known—the micro-encapsulated red phosphorus powder utilized in the process of the invention rises no problem of environmental hygiene and of operative safety.

The detailed description and the examples given hereinafter will more exhaustively illustrate the present invention.

The process according to the invention is accomplished by always carrying out the operations in an inert and dry gas atmosphere, preferably in a nitrogen atmosphere having a water content below 5 ppm (ppm=parts per million, by volume), and by always utilizing previously dried chemical components. That is done in relation to the fact that water is a strong inhibitor of the anionic polymerization of CL.

As regards more particularly CL, this is furthermore maintained, prior to the use, preferably for at least 24 hours in a drying environment.

The anionic polymerization reaction of CL is effected, according to the invention, after having added to CL (by following one out of the three procedures to be described in the following) the micro-encapsulated red phosphorus powder, and it is accomplished according to the following steps:

(a) CL is melted by bringing it to a temperature of about 85° C.;

(b) to said CL, a polymerization initiator of the anionic type in amount ranging from 0.1 to 2% by moles (referred to CL), preferably from 0.2 to 1% by moles, is added, maintaining the temperature (during the reaction between CL and initiator) at a value ranging from 80° to 130° C., depending on the type of initiator employed, which may be selected from: Grignard reagents, alkaline or alkaline-earth metals and hydrides, borohydrides, oxides, hydroxides, organo-derivatives thereof, and the like. According to the invention, metal Na or LiH are preferably used, the temperature of the reaction between CL and initiator being maintained in such cases at 90° and 110° C. respectively.

(c) At the end of the above reaction (i.e. when hydrogen envelopment stops) the temperature is brought to a value ranging from 120° to 180° C., preferably from 150° to 160° C., the activator (which is selected from N-acyl-lactams and precursors thereof, preferably N-acetylcaprolactam) is added in an amount ranging from 0.1 to 2% by moles (referred to CL), preferably from 0.2 to 1% by moles, and the monomeric mass so prepared is transferred into proper molds of conventional type, maintained at a temperature in the range of from 120° to 190° C., preferably from 150° to 160° C., in order to cause the polymerization reaction to occur, such reaction being concluded in a time of 3–15 minutes.

By varying the amounts of initiator and of activator, as well as the ratio between said amounts, it is possible to modify the mean molecular mass of the polymer (PCL), the distribution of the molecular masses thereof, the maximum conversion degree of the monomer to polymer and at last the polymerization rate.

By varying the polymerization temperature within said range of 120°–190° C., no considerable variations in the product are obtained; the typical preferred temperature is at any rate of about 155° C.

The addition of the micro-encapsulated red phosphorus powder to the monomer (CL) prior to its polymerization described hereinbefore, is carried out, according to a preferred procedure (hereinafter referred to as "procedure A"), by homogeneously dispersing said powder in the CL, at a temperature from 80° to 120° C., in the whole mass of the CL to be polymerized.

The micro-encapsulated red phosphorus powder (hereinafter referred to as red-P) has particle sizes below 40 $\mu$m, with at least 80% by weight being below 10 $\mu$m. The choice of such sizes is connected with the requirement that red-P should not settle after dispersion in CL before and during the polymerization of the latter.

To facilitate the use (in transportations, handlings, proportionings and the like), red-P, according to the invention, is preferably carried in $\epsilon$-caprolactam, wherein it is dispersed to form a solid mixture in the form of flakes and the like at about 50% by weight of phosphorus. Said red-P/CL 50/50 mixture will be hereinafter referred to as "red-P/CL concentrate".

A variant of "procedure A" ("procedure B") consists in dividing the CL intended for polymerization into two portions, into one of which (for example 50-70%) red-P is dispersed (always at 80°–120° C.), while in the remaining portion (50-30%) the reaction between CL and the polymerization initiator is accomplished by operating according to operative steps (a) and (b) already described. Said two CL portions so separately prepared are then mixed with each other and the activator is added in order to cause the polymerization reaction to occur as is described in step (c) illustrated hereinabove.

A further variant of the method (or "procedure C") is similar to "procedure B", with the only exception that the activator is added before instead of after joining the two abovesaid CL portions intended for polymerization, namely by adding the activator to the CL portion containing the red-P.

According to the invention, along with red-P there may be dispersed or dissolved in CL, prior to its polymerization, a few substances which, with said red-P, are capable of exerting a synergistic action for the purpose of the flame-retarding action, and/or PCL additives and coadjuvants known in the art, such as dyes, pigments, antistatic agents, reinforcing fillers (for example glass fibres) and the like.

Still in accordance with the invention, the anionic polymerization reaction of CL (containing red-P and/or other additives and coadjuvants) may be conducted in suitable reactors, instead of in the abovesaid molds, said reactors, known in the technique, being equipped with auxiliary means, which are known too, suited to extract (such as screws and the like) and to extrude PCL in the molten-plastic state, then consolidating said PCL to the solid state in self-extinguishing formed PCL bodies, such as monofilaments, granules and the like. When said monofilaments are to be produced, the micro-encapsulated red phosphorus powder has preferably, according to the invention, particles having an average diameter lower than 5 $\mu$m.

The red-P amount which is added to the CL ranges, according to the invention, from 1% to 20%, preferably from 6% to 10% by weight (referred to CL).

With a view to better illustrating the present invention, a few examples of embodiment thereof are described thereinafter, said examples being given only for illustrative purposes and are not intended to limit the invention.

In said examples, the following products are used:
ε-caprolactam with a water content below 50 ppm;
red phosphorus micro-encapsulated in melamine resin (according to European Patent Application No. 81107981.3, as already described above) available from SAFFA S.p.A., Milan carried in ε-caprolactam in which it is dispersed to form a mixture at about 50% by weight of red phosphorus ("red-P/CL concentrate"); said red-P has average particles sizes below 40 μm, with about 80% below 10 μm;
chlorinated polycyclic hydrocarbon $C_{18}H_{12}Cl_{12}$ at 65.1% by weight of chlorine, having the formula

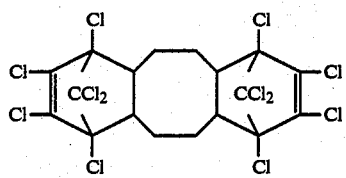

melamine cyanurate.

All the aforesaid products are dried before being used in the operations described in the examples. In said examples, the following process and product parameters are determined:
conversion yield of CL to PCL, determined both by removal of the unreacted CL by sublimation under vacuum in oven at 110° C. during 48 hours, and by washings with methanol at room temperature;
glass transition temperature (Tg, °C.), melting temperature (melt.T, °C.) and crystallization temperature (cryst. T, °C.) of the PCL by means of conventional calorimetric measurements carried out at constant heating and cooling rates (20° C./minute and 10° C./minute, respectively);
PCL decomposition curve by thermogravimetric analysis in nitrogen, with heating rates of 10° C. per minute;
modulus of elasticity (M) and unitary tensile strength (R) of PCL by means of tensile tests carried out with Instron dynamometer at room temperature and at an initial deformation rate of 100% per minute;
behaviour of PCL to flame by means of the conventional measurement of "Limiting Oxygen Index (LOI)" and the known determination of the "class" according to UL 94.

The values of the abovesaid parameters are recorded on table 1.

EXAMPLE 1

Comparative test (preparation of PCL without incorporation of flame retarding agent).

1000 g of CL were heated to about 85° C.; LiH (as a initiator) in an amount of 0.2% by moles with respect to CL was added, while homogenizing, and the so additioned CL was heated to a temperature of 110° C. until conclusion of the reaction between CL and LiH (formation of lithium caprolactamate), which as considered to be completed when no development of hydrogen bubbles was any longer observed; the temperature was then raised and, when it reached the value of about 155° C., N-acetylcaprolactam (activator) in an amount of 0.6% by moles with respect to CL was added, while homogenizing, then transferring the so additioned CL into a mold (openable) shaped in the form of a parallelepipedon, maintained at a temperature of about 155° C.; under such conditions, CL polymerized in a time of about 5 minutes, with a conversion to PCL equal to 98%.

From the resulting PCL block, specimens were obtained for determining the characteristics of PCL (as indicated hereinabove).

The values of said characteristics are reported in table 1.

Further PCL blocks were then prepared by repeating the said operations in an identical manner, but varying from time to time a single parameter of the process. In particular: two PCL blocks were prepared employing a polymerization-in-mold temperature of 140° C. and 170° C., respectively, a third PCL block, using as an initiator, metal Na instead of LiH, and finally a fourth PCL block, using initiator (metal Na) and activator amounts equal, for both, to 1% by moles referred to total CL: in all the four abovesaid cases, no appreciable product and process differences were observed, while only a quicker reaction kinetics was noticed when using metal Na and employing higher concentrations of initiator and of activator.

EXAMPLE 2

Three PCL preparations were effected, employing the operative conditions of example 1 (at a polymerization-in-mold temperature of 155° C., such temperature being then employed also in the other examples which follow), with the exception that red phosphorus was added to the monomer (CL) prior to its polymerization—according to the invention—, said red phosphorus being encapsulated and carried as already described above ("red-P/CL concentrate", in the amounts as specified later on); furthermore, there were utilized amounts of both initiator (metal Na) and activator (N-acetylcaprolactam) equal, for both, to 1% by moles with respect to total CL.

More particularly, three preparation were accomplished, differring from one another in that there were adopted for them (for incorporating the red-P into the CL in the form of said "concentrate") the above-described "procedure A", "procedure B" and "procedure C", respectively. In particular, procedures "B" and "C" were accomplished by causing the initiator (Na) to react with a CL portion corresponding to 30% of total CL. The "red-P/CL concentrate" amounts incorporated in the monomer (expressed as % by weight of phosphorus with respect to the total monomer) were equal to 8%, 9% and 10% respectively for "procedures" "A", "B" and "C".

For the three above-mentioned preparations, substantially like process and product results were obtained.

In particular: the polymerization times were of about 4 minutes, the conversions of CL to PCL were equal to 98% by weight, and the UL 94 Class was always V-O, as a demonstration that the formed PCL bodies obtained as described hereinbefore had excellent self-extinguishing properties. Furthermore, the so prepared PCL bodies containing red-P revealed on thermogravimetric analysis a better resistance to decomposition as compared with the analogous PCL bodies without red-P prepared according to example 1.

More precisely: the temperature at which (in said analysis) the specimen containing red-P exhibited a weight loss of 10% was higher by about 50° C. than the analogous temperature relating to the specimen without red-P.

At last, from the data recorded on Table 1 it is apparent that the physical and mechanical characteristics, in particular the melting temperature and the crystallization temperature, were not adversely affected by the presence of red-P in the PCL.

EXAMPLE 3

PCL was prepared as in example 2 (according to "procedure A"), by incorporating into the monomer 30% by weight of "red-P/CL concentrate", namely corresponding to 15% by weight of phosphorus. The process and product results were substantially analogous with those obtained in example 2 (Table 1).

This example proves the possibility of obtaining PCL with high red-P contents, to be utilized, for example, in blends consisting of a plurality of components (polyblends), where said PCL, besides being one of the components thereof, acts as a carrier for red-P as a flame retardant for said polyblends.

EXAMPLE 4

Three PCL preparations were accomplished adopting the operative conditions of example 1, with the exception that to the monomer (before its polymerization and in accordance with "procedure A") there was added the abovesaid chlorinated polycyclic hydrocarbon (as a flame retardant) in amounts of 5%, 10% and 15% by weight, respectively, referred to the total monomer.

The resulting formed PCL bodies did not withstand the inflammability test UL 94 (see Table 1), furthermore, the conversions of CL into PCL were very low (85, 75% and 30%, respectively) with rather long polymerization times (13, 20 and 60 minutes, respectively), what proves the negative action of the flame retarding agent used with the anionic catalytic system (initiator+activator).

EXAMPLE 5

PCL was prepared as in example 4, with the only difference that, as a flame retardant, there was added a mixture of said chlorinated polycyclic hydrocarbon with "red-P/CL concentrate" in such amounts that, with respect to the total CL, said two products represented 5% and 2% respectively (1% of red-P) by weight (chlorine/phosphorus ratio=3). There was obtained a formed PCL body which, subjected to UL 94 test, was attributable to Class V-O (i.e. self-extinguishing). However, the conversion of CL into PCL was only of 79% and the polymerization time of 10 minutes.

At any rate, this example proves (by comparison with example 4; Table 1) that red-P exerts a strong synergistic action as a flame retarding agent.

EXAMPLE 6

PCL was prepared as in example 2 with "procedure A", with the only difference that instead of red-P, melamine cyanurate, as a flame retardant, was incorporated into the monomer in an amount equal to 5% by weight referred to the total monomer.

A CL to PCL conversion yield of 25% (which is too low for an industrial process), with a polymerization time of 45 minutes, which is very long, was obtained. It is apparent that the flame retardant employed affected the anionic catalytic system (initiator+activator).

EXAMPLE 7

PCL was prepared as in example 2 with "procedure B", with the only variant that to the monomer portion into which the red-P was incorporated, also glass fibres, as reinforcing agents, were added in amounts equal to 25% by weight referred to the total monomer. Said fibres, of the conventional type, had an average length of 1.2 mm and an average diameter of 0.01 mm.

A final formed body made of self-extinguishing (class V-O according to UL 94) and reinforced PCL was obtained.

The polymerization time was 6 minutes and the conversion yield of CL to PCL was 98%.

To the above-mentioned process according to the invention, several technically equivalent additions and/or modifications may be brought, all included, however, in the scope of the invention.

In particular, the red phosphorus particles may be micro-encapsulated (instead of with the previously described modified melamine resin) with other types of synthetic resins, which are functionally equivalent for the purpose of encapsulating said particles, such as, for example, conventional melamine resins, phenolic resins, polyester resins, epoxy resins, acrylic resins, polycarbonates and the like, said resins being suited to form a continuous film around the red phosphorus particles.

TABLE 1

| Example | Flame retarding agent | Resistance to flame | | Tg | melt. T | cryst. T | Tensile properties | |
|---|---|---|---|---|---|---|---|---|
| | | LOI | UL 94 | | °C. | | R N/mm² | M N/mm² |
| 1 | none | 21 | burns | 46 | 220 | 186 | 58 | 1700 |
| 2 and 3 | red-P (8%–9%–10%–15%) | 25–27 | V-O | 43–45 | 220 | 186 | 55 | 1600 |
| 4 | Chlorinated polycyclic hydrocarbon (5%–10%–15%) | 22–23 | burns | 50–51 | 220 | 186 | 60 | 2200 |
| 5 | Chlorinated polycyclic hydrocarbon (5%) + red-P (1%) | 24 | V-O | 51 | 220 | 186 | 60 | 1900 |

LOI: according to ASTM-D 2863
UL 94: Underwriter Laboratories Standards
R and M: determined on 50 × 5 × 0.2 mm thin films

We claim:

1. A process for preparing self-extinguishing shaped thermoplastic bodies comprising poly-caprolactam and red phosphorus, which process comprises preparing at first a mixture consisting of 80 to 99% of molten ε-caprolactam monomer and 1–20% of red phosphorus powder, said powder being in the form of microparticles encapsulated in a synthetic resin shaping the mixture into said shaped body, and then causing the anionic polymerization of said monomer to occur.

2. The process according to claim 1, which comprises:
(a) preparing a mixture consisting of 80-99% by weight of ε-caprolactam in the molten state and 1-20% by weight of red phosphorus powder, said powder being in the form of microparticles encapsulated in a synthetic resin, which microparticles consist of at least 80% by weight of particles having sizes below 10 μm;
(b) adding to said mixture 0.2-1% by moles relative to ε-caprolactam of an anionic initiator, and causing the reaction between the initiator and the ε-caprolactam to occur at a temperature ranging from 90° to 110° C., said initiator being selected from the group consisting of metal-Na and LiH;
(c) adding to said warm mixture 0.2-1% by moles relative to ε-caprolactam of a polymerization activator consisting of N-acetyl-caprolactam, thus obtaining an additioned monomeric mass ready for polymerization;
(d) causing a polymerization reaction of said mass to occur while maintaining said mass at a temperature between 150° and 160° C. for a time ranging from 3 to 15 minutes, said polymerization reaction being accomplished in a shaped cavity of a mold.

3. The process according to claim 2, in which also at least a coadjuvating substance selected from the group consisting of flame-retarding synergistic agents, reinforcing fillers, pigments, dyes, nucleating agents, antistatic agents, antioxidants, stabilizers is furthermore incorporated into said molten ε-caprolactam.

4. The process according to claim 3, in which said coadjuvating substance consists of reinforcing glass fibers.

5. The process according to claim 1 in which said microencapsulated red phosphorus powder is incorporated and dispersed, in the mass of molten ε-caprolactam, which is formed into flakes or granules consisting of about 50% (by weight) of said powder and of about 50% (by weight) of solid ε-caprolactam.

* * * * *